United States Patent [19]

Hrncirik

[11] Patent Number: 5,303,394
[45] Date of Patent: Apr. 12, 1994

[54] FEEDBACK STABILIZED Q MULTIPLIER FILTER CIRCUIT

[75] Inventor: Dennis J. Hrncirik, Hiawatha, Iowa

[73] Assignee: Rockwell International, Seal Beach, Calif.

[21] Appl. No.: 742,998

[22] Filed: Aug. 9, 1991

[51] Int. Cl.$^5$ .................. H04B 1/48; H04B 1/10
[52] U.S. Cl. .................. 455/84; 455/126; 455/266; 455/307; 333/17.1
[58] Field of Search .............. 455/126, 127, 84, 246.1, 455/247.1, 239.1, 240.1, 307, 311, 339, 340, 260; 330/129, 131, 136, 107, 109; 331/25; 333/17.1, 174

[56] References Cited

U.S. PATENT DOCUMENTS

| | | | |
|---|---|---|---|
| 3,667,067 | 5/1972 | Levell | 331/59 |
| 3,900,823 | 8/1975 | Sokal et al. | 455/126 |
| 4,190,808 | 2/1980 | Fajen | 331/59 |
| 4,476,437 | 10/1984 | Fujiwara | 330/138 |
| 4,532,478 | 7/1985 | Silagi | 330/151 |
| 4,563,775 | 1/1986 | Yokosuka | 455/126 |
| 4,709,403 | 11/1987 | Kikuchi | 455/126 |
| 4,819,268 | 4/1989 | Kahn | 455/126 |
| 4,872,206 | 10/1989 | Graziadei et al. | 455/246.1 |
| 5,101,173 | 3/1992 | Di Piazza | 330/136 |
| 5,175,879 | 12/1992 | Ellingson et al. | 455/126 |

OTHER PUBLICATIONS

Shrader, Robert L., Electronic Communication, 1985, pp. 222-223.

Primary Examiner—Reinhard J. Eisenzopf
Assistant Examiner—Mark D. Wisler
Attorney, Agent, or Firm—John J. Horn; Kyle Eppele; H. Fredrick Hamann

[57] ABSTRACT

A Q multiplier circuit which is automatically feedback stabilized through the use of phase and gain control loops and thereby adapted for use as an amplifier and filter. In a typical embodiment, a variable gain amplifier and band pass filter are provided in a forward signal path while a phase shifter is provided in a feedback signal path. The output of the circuit is sampled and compared to a fixed reference in order to generate a gain control signal for application to the variable gain amplifier. The input signal on the forward signal path is sampled along with the signal on the feedback signal path and the phases of these samples are compared in order to generate a phase control signal for application to the phase shifter. The variable gain amplifier is controlled to maintain a predetermined power output level while the phase shifter is controlled to maintain positive feed back.

3 Claims, 6 Drawing Sheets

Q MULTIPLIER AS PRESELECTOR OR POSTSELECTOR

Q MULTIPLIER GAIN AND BANDWIDTH $P_{IN} = -10$ dB $P_{IN} = -30$ dB

FEEDBACK STABILIZED Q MULTIPLIER FILTER CIRCUIT

BACKGROUND OF THE INVENTION

The present invention relates to Q multiplier circuits employing regenerative feedback for signal amplification and filtering.

Referring now to FIG. 1 a typical prior art Q multiplier circuit 15 is shown as including a forward signal path 6 and a feedback signal path 8. The forward signal path 6 connects the input terminal 12 to the output terminal 14 and includes a variable gain amplifier 16 and a bandpass filter 18, as well as a signal combiner 20 adjacent to input terminal 12 and a signal splitter 22 adjacent to the output terminal 14. The feedback signal path 8 connects the signal splitter 22 to the signal combiner 20 and includes the phase shifter 24. The feedback signal path 8 is intended to provide positive feedback or reinforcement of the signals applied to the input 12 as part of the output of the amplifier 16 is directed by the signal splitter 22 through the phase shifter 24 to the signal combiner 20 where it is added to the input signal applied at the terminal 12. The band pass filter selects the operative frequency for the circuit 15 while the amplifier 16 provides gain corresponding to a predetermined amount of amplification and selectivity. Unfortunately, prior Q multiplier circuits have required manual gain adjustment and manual phase adjustment to insure maximum amplification and selectivity while avoiding oscillation and to insure that positive feedback is maintained into the forward signal path.

It is therefore an object of the present invention to provide a feedback stabilized Q multiplier circuit which is automatically regulated with respect to gain and phase in order to avoid problems with oscillation and to maintain positive feedback.

It is another object of the present invention to provide a feedback stabilized Q multiplier circuit which provides a controllable level of selectivity or Q (quality factor) regardless of the level of the input signal to the circuit.

It is a further object of the present invention to provide a Q multiplier circuit which is adapted for operating as a radio receiver preselector or a radio transmitter postselector having selectivity controllable in accordance with signal conditions.

It is yet another object of the present invention to provide a Q multiplier circuit which is adapted for use in suppressing spurious signals ordinarily generated by typical phase lock loop synthesizers.

SUMMARY OF THE INVENTION

The present invention comprises a Q multiplier circuit for use as an amplifier and filter which is automatically feedback stabilized through the use of phase and gain control loops. In a typical embodiment, a variable gain amplifier and band pass filter are provided in a forward signal path while a phase shifter is provided in a feedback signal path. The output of the circuit is sampled and compared to a fixed reference in order to generate a gain control signal for application to the variable gain amplifier. The input signal to the forward signal path is sampled along with the signal on the feedback signal path and the phases of these samples are compared in order to generate a control signal for application to the phase shifter. The variable gain amplifier is controlled to maintain a constant power output level consistent with the reference signal while the phase shifter is controlled to maintain positive feedback to the forward signal path.

In an alternative embodiment, the gain provided by the Q multiplier circuit is regulated to remain constant regardless of input signal level thereby allowing the Q multiplier circuit to maintain a constant Q-factor or selectivity in the filtering of input signals to the circuit. Feedback stabilized Q multiplier circuits may be used for filtering of phase lock loop generated synthesizer signals and preselection or postselection of radio frequency communication signals with controlled selectivity.

DESCRIPTION OF THE PREFERRED EMBODIMENT

Figure 1:
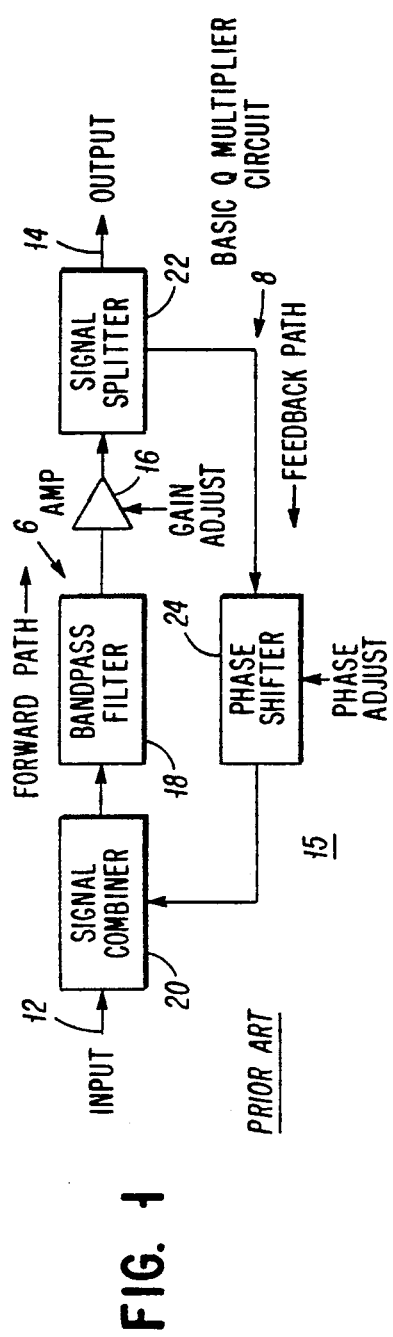
FIG. 1 provides a block diagram of a prior art Q multiplier circuit featuring manual adjustment of amplifier gain in the forward signal path and manual adjustment of phase in the feedback signal path.
Figure 2:
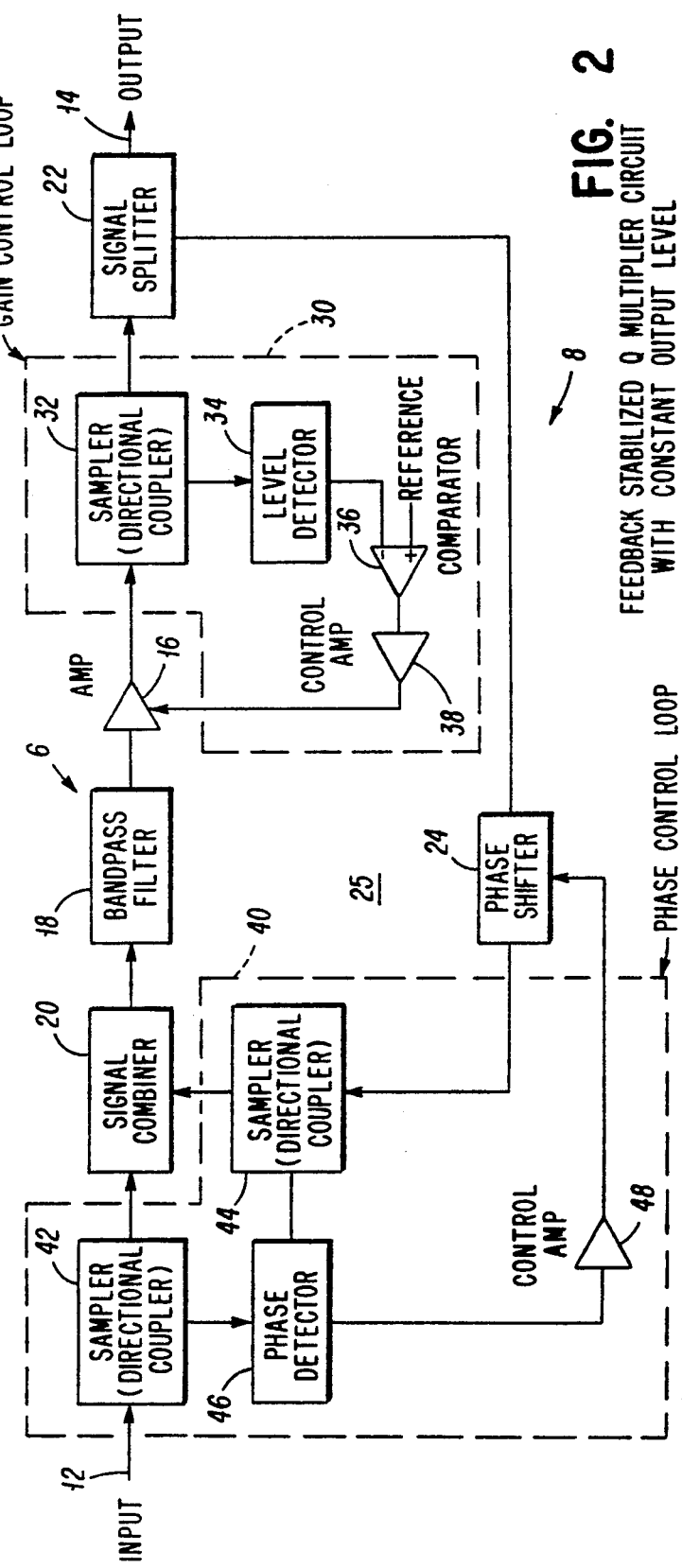
FIG. 2 provides a block diagram of a feedback stabilized Q multiplier circuit in accordance with the principles of the present invention in which stabilized operation is automatically provided by separate gain control and phase control loops.

Referring now to FIG. 2, a feedback stabilized Q multiplier circuit 25 in accordance with the principles of the present invention is shown as including a gain control loop 30 and a phase control loop 40 for automatically stabilizing the operation the circuit. The gain control loop 30 includes a directional coupler 32 connected in the forward signal path 6 at the output of the amplifier 16 for directing a sample of the output of the amplifier 16 to the level detector 34 where the signal may be rectified to a DC voltage corresponding to its RF signal amplitude. The output of the level detector 34 is provided as an input to the comparator 36 along with a reference signal. The comparator 36 compares the magnitude of the output of the level detector 34 with the magnitude of a reference signal and generates an error signal which is provided to a control amplifier 38 having its output connected to the gain control terminal of the amplifier 16. The Q multiplier circuit 25 can thereby be controlled to have a predetermined output level consistent with the level of the reference signal provided to the comparator 36 by adjustment of the gain of the amplifier 16 in response to changes in the input signal to the circuit. The phase control loop 40 includes a directional coupler 42 connected into the forward signal path 6 adjacent the input terminal 12 and a directional coupler 44 connected into the feedback signal path 8 adjacent to the signal combiner 20. Samples of the signals on the forward signal path 6 and on the feedback signal path 8 are directed by the couplers 42 and 44 to the phase detector 46 for phase comparison. The phase detector compares the signals from the couplers 42 and 48 to insure that they are ninety degrees out-of-phase and provides a phase error signal to the control amplifier 48 which is in turn connected to the control input of the phase shifter 24. The lines between the directional couplers 42 and 44 and the phase detector 46 are adjusted in length to provide predetermined delays of sufficient duration so that the signals should ordinarily be ninety degrees out-of-phase at the phase detector when positive feedback is being provided by the feedback signal onto the forward signal path 6. The phase control loop 40 allows for comparison of the phases of the input on the forward signal path 6 and the feedback on the feedback signal path 8 so that positive feedback is always provided in the Q multiplier circuit 25 by the feedback signal.

Figure 3:
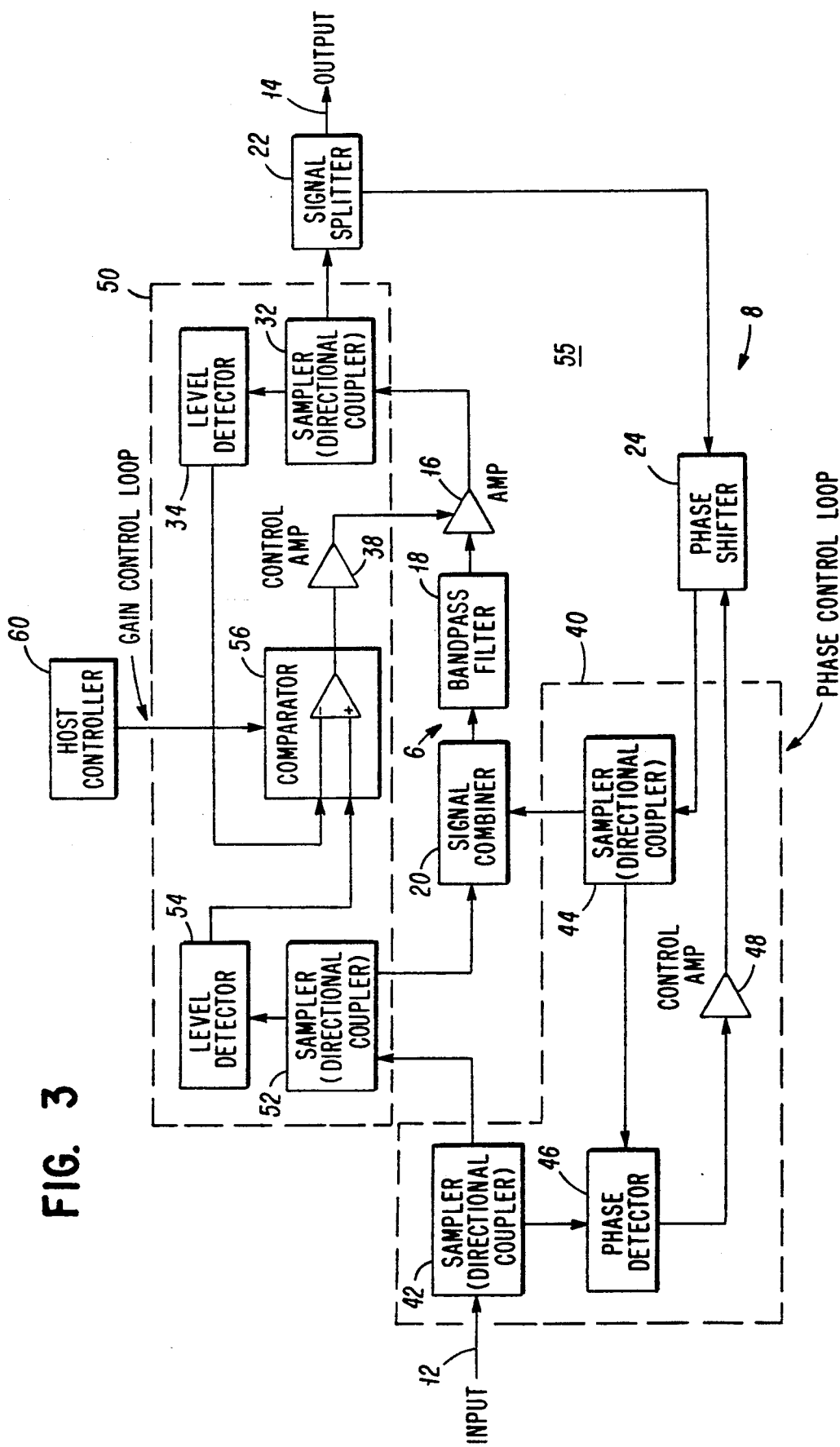
FIG. 3 provides a block diagram of a feedback stabilized Q multiplier circuit in accordance with the principles of the present invention in which controlled selectivity is provided in accordance with signals from a controller.

Referring now to FIG. 3, an alternative embodiment of the present invention is shown constituting a feedback stabilized Q multiplier circuit 55 in which a constant gain ratio is maintained between input and output subject to adjustment by a host controller 60. The gain control loop 50 for the Q multiplier circuit 55 includes a directional coupler 52 which samples the input signal applied to the input terminal 12 and a level detector 54 which rectifies this signal to a DC level. The directional coupler 32 and level detector 34 operate in a fashion similar to the devices in the gain control loop 30 of the circuit 25 to sample the output of the amplifier 16 and generate a DC voltage corresponding to the amplitude of this signal. The outputs of the level detectors 34 and 54 are supplied to a comparator module 56 which compares the magnitudes of these voltages in accordance with a control signal provided by the host controller 60. The signal provided by the host controller 60 to the comparator module 56 represents a particular gain ratio between the input and output of the Q multiplier and therefore a desired quality factor level or selectivity for the circuit 55. This gain ratio and the corresponding selectivity of the circuit 55 may be adjusted by the host controller 60 in accordance either with manual inputs provided by way of a user interface or automatically in response to signal conditions. The gain control loop 50 therefore provides for control over the selectivity of the Q multiplier circuit 55 by the host controller 60 and for a given selectivity to be maintained regardless of variations in the input signal level once a desired gain ratio has been selected. The Q multiplier circuit 55 otherwise operates in a fashion similar to the circuit 25 previously described with a forward signal path 6 including a variable gain amplifier 16 and a band pass filter 18 as well as a signal combiner 20 and a signal splitter 22. The circuit 55 also includes a feedback signal path 8 extending from the signal splitter 22 to the signal combiner 20 by way of the phase shifter 24. Further, a phase control loop 40 includes directional couplers 42 and 44 for sampling the forward and feedback signals, a phase detector 46 and control amplifier 48 for generating a control signal for supply to the phase shifter 24. Again, the operation of the Q multiplier circuit 55 is stabilized by separate phase and gain control loops, however, the gain control loop 50 provides a constant level of selectivity under control of the controller 60.

Figure 4:
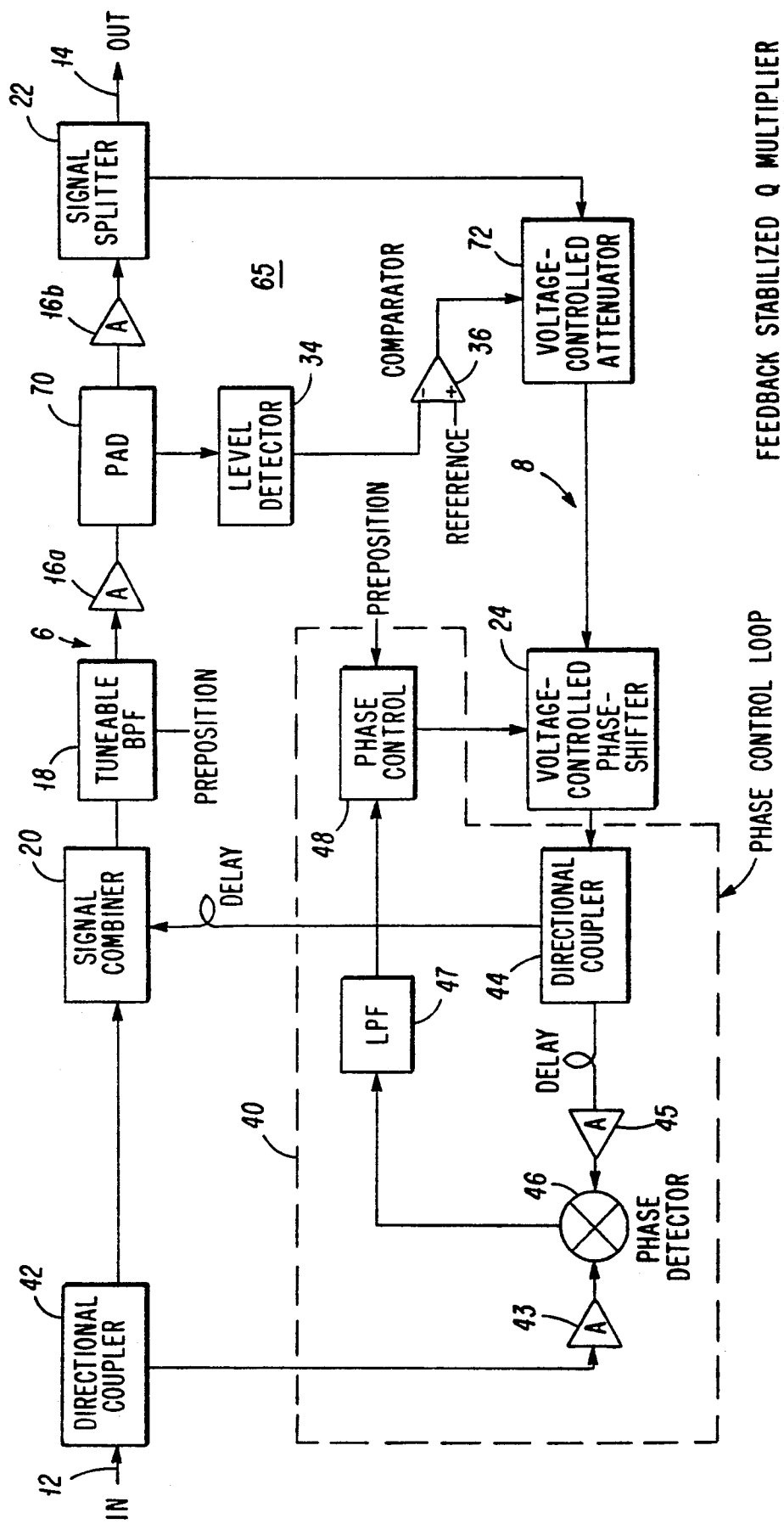
FIG. 4 provides a block diagram of a feedback stabilized Q multiplier circuit in accordance with the principles of the present invention in which variations in the required circuitry are exemplified by the use of controlled attenuation in the feedback signal path to control gain.

Referring now to FIG. 4, another embodiment of the present invention is shown wherein gain control is provided in the feedback path through the use of controlled attenuation. The Q multiplier circuit 65 includes a forward signal path 6 having a pair of amplifiers 16a and 16b along with a tunable band pass filter 18 and a feedback signal path 8 having a phase shifter 24 extending between a signal splitter 22 and a signal combiner 20. Gain control is provided by a voltage controlled attenuator 72 in the feedback signal path 8 ahead of the phase shifter 24. A pad 70 is used in sampling the signal in the forward single path 6 and providing an input to the level detector 34. The level detector 34 rectifies this signal to provide a DC level to a comparator 36 which compares this level with a reference voltage. The output of the comparator 36 is used to control the attenuator 72 and regulate the gain of the Q multiplier circuit 65 so as to maintain a fixed output power level. The phase control loop 40 operates in a manner similar to the phase control loops described with respect to the Q multiplier circuits 25 and 55. The directional couplers 42 and 44 divert samples of the signal in the forward signal path 6 and the feedback signal path 8 through level control amplifiers 43 and 45 to a phase detector 46. The output of the phase detector 46 is provided to a phase control module 48 through a low pass filter 46 which suppresses high frequency noise. The phase control module 48 adjusts the signal from the phase detector 46 in order to provide an appropriate control voltage to phase shifter 24. The Q multiplier circuit 65 illustrates how gain control may be accomplished through the use of an attenuator which may be positioned in either the forward single path 6 or the feedback signal path 8. It should be noted that other components of the circuit 65 such as the band pass filter 18 may also positioned within either the forward signal pass 6 or feedback signal path 8.

Figure 5:
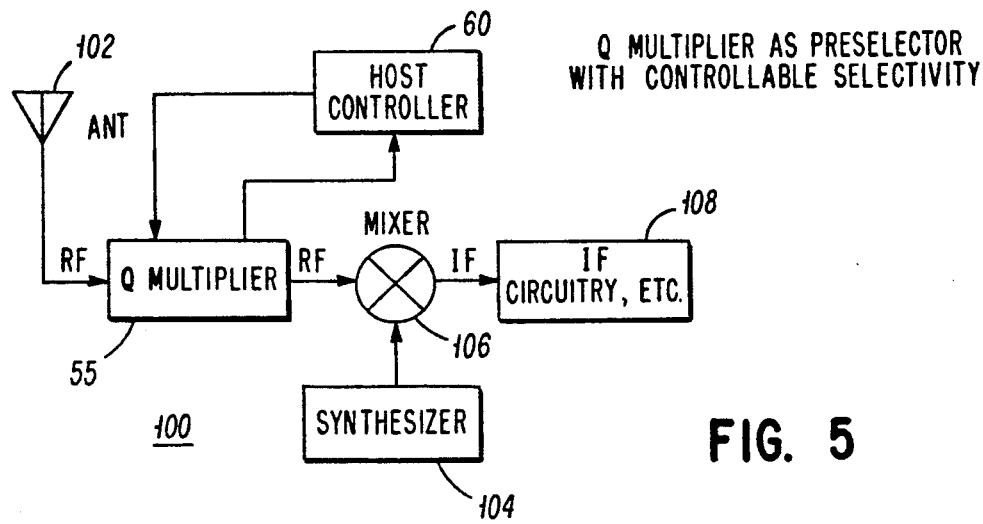
FIG. 5 provides a block diagram showing a Q multiplier circuit in accordance with the present invention being used as a preselector with controlled selectivity in a radio receiver.

Referring now to FIG. 5, the circuitry 100 is illustrative of the front end of a radio receiver in which a Q multiplier circuit 55 is used as a preselector with controllable selectivity. Radio frequency communication signals are picked up by the antenna 102 and directed to the Q multiplier circuit 55 where they are filtered in accordance with a quality factor as controlled by the host controller 60. Filter signals are supplied from the Q multiplier circuit 55 to the mixer 106 where they are mixed with injection signals from the synthesizer 104 to produce intermediate frequency signals which are supplied for processing to the rest of the receiver's circuitry 108. The Q multiplier allows for controlled preselection of the signals supplied to the mixer 106 and for filtering to take place in response to signal conditions. Data regarding noise or jamming signals in proximity to the operational frequency of the receiver may be supplied from the Q multiplier circuit or other detection circuitry to the host controller 60 which then may respond by adjusting the Q-factor of the Q multiplier circuit 55 in order to provide for a level of selectivity sufficient to reject interfering signals.

Figure 6:
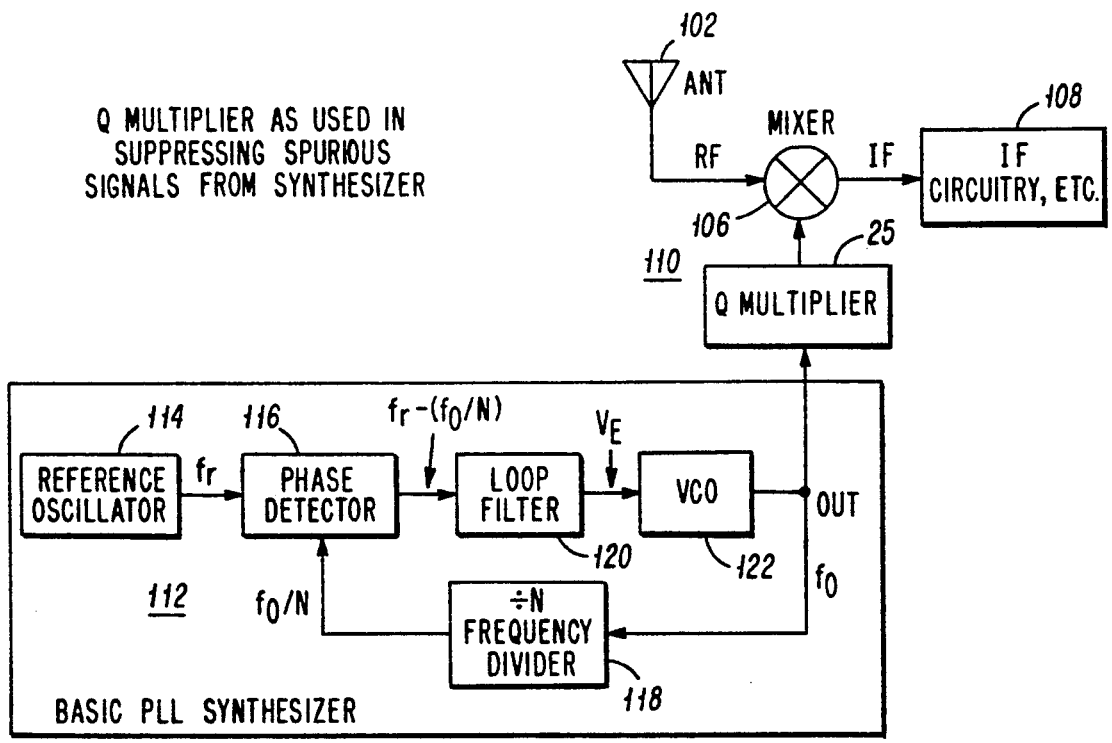
FIG. 6 provides a block diagram of a Q multiplier circuit in accordance with the principles of the present invention being used as a filter for suppressing spurious signals in the injection signal output of a phase lock loop synthesizer as provided to a radio frequency mixer in a radio receiver.

Referring now to FIG. 6, the circuitry 110 also illustrates the front end of a radio receiver in which a Q multiplier circuit 25 is used for suppressing spurious signals generated by an otherwise conventional phase lock loop synthesizer 112. Radio frequency communications signals pick up by the antenna 102 are directed to the mixer 106 where they are mixed with injection signals filtered by the Q multiplier circuit 25 to produce intermediate frequency signals supplied to the rest of the receiver's circuitry 108. The phase lock loop synthesizer 112 includes a reference oscillator 114 which provides a reference signal to phase detector 116 which compares the phase of the reference signal to the phase of a divided signal provided by frequency divider 118. The output of the phase detector 116 is passed through a low pass filter 120 and is provided to a voltage control oscillator 122 which generates the injection signal output of the phase lock loop for supply to Q multiplier circuit 25 and for supply to the frequency divider as feedback to the phase detector 116. The Q multiplier circuit 25 provides a simple and effecting means of filtering the output of the phase lock loop synthesizer to suppress spurious signals well known to be generated by typical phase lock loop synthesizers.

Figure 8A:
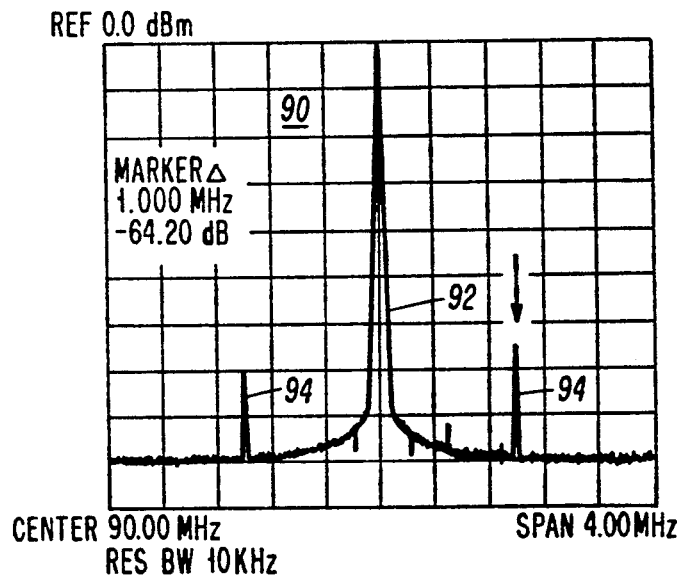
FIGS. 8A and 8B provide graphs illustrating the performance of a Q multiplier circuit in accordance with the principles of the present invention as used in suppressing spurious signals generated by a phase lock loop synthesizer.
Figure 8B:
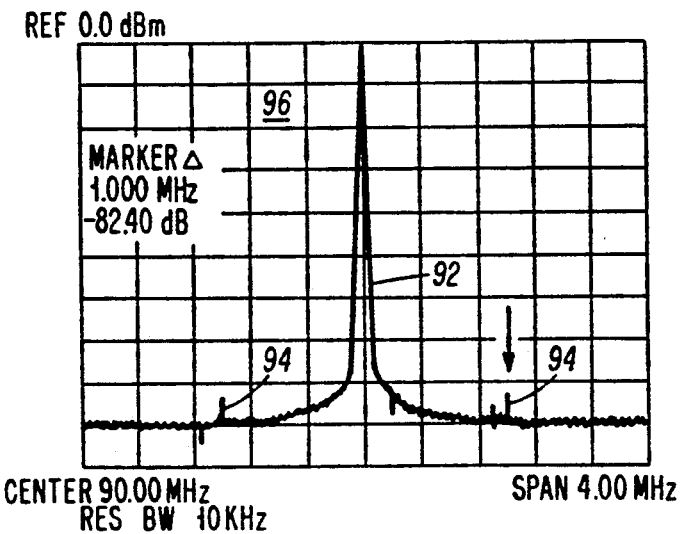

Referring now to FIGS. 8A and 8B, the effectiveness of a Q multiplier circuit 25 suppressing spurious signals generated by a typical synthesizer circuit such as the synthesizer 112 is illustrated by the graphs 90 and 96. The graph 90 shows a synthesizer output which has been passed through a Q multiplier circuit having 10 dB of gain and in which spurious signals 94 are shown as approaching the −64 dB level. The graph 96 shows a synthesizer output which has been passed through a Q multiplier circuit with the Q multiplier circuit now providing 30 dB of gain and in which spurious signals 94 are substantially reduced in magnitude to approximately the −82 dB level.

Figure 9:
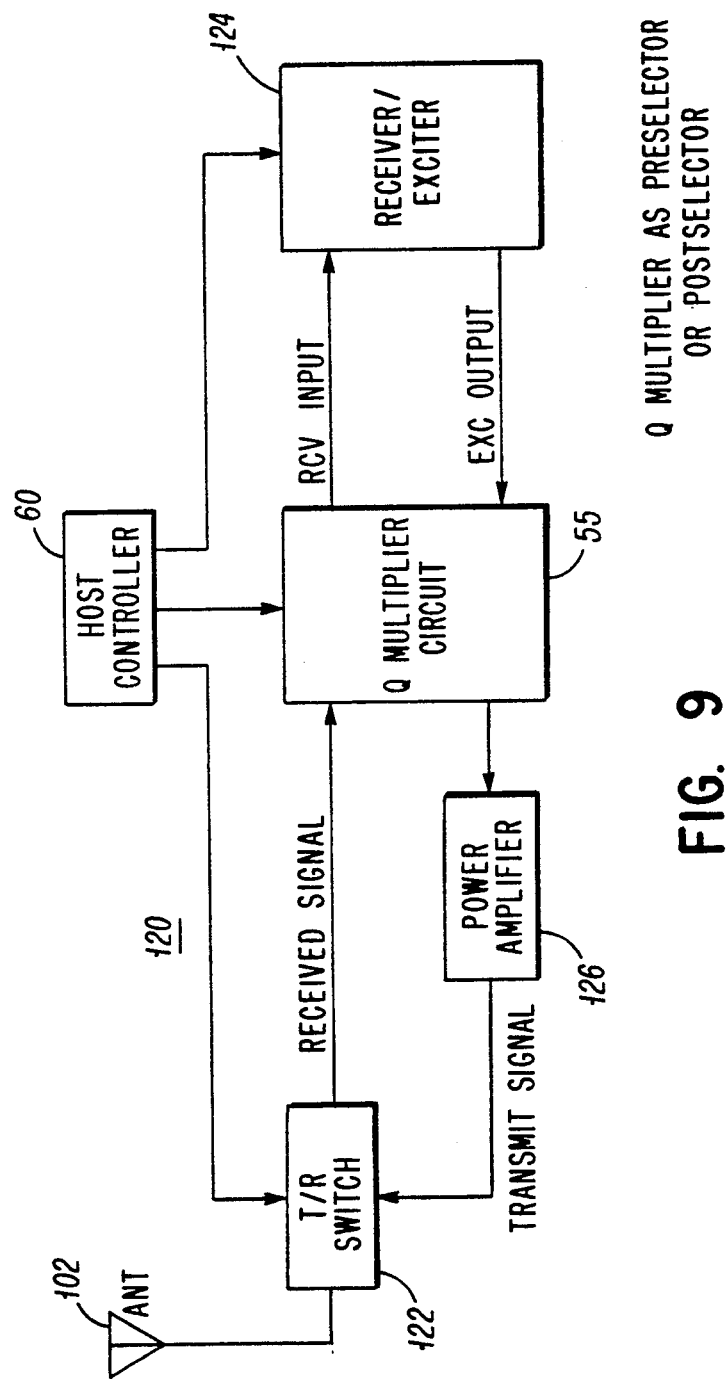
FIG. 9 provides a block diagram of a Q multiplier circuit in accordance with the principles of the present invention being used as a preselector or postselector with controlled selectivity in a radio transmitter/receiver system.

Referring now to FIG. 9, the radio circuitry 120 illustrates the use of the Q multiplier circuit 55 as either a preselector filter or postselector filter under control of a host controller 60. The host controller 60 regulates the operation of the Q multiplier circuit 55, the transmit/receive switch 122 and the receiver/exciter unit 124 to operate in either a receive or transmit mode. When in the receive mode, the radio circuitry 120 directs radio frequency communication signals picked up by the antenna 102 through the transmit/receive switch 122 to the Q multiplier circuit 55. After filtering by the Q multiplier circuit 55 the communication signals are passed on to the receiver circuitry of the receiver/exciter unit 124. When in the transmit mode, radio communications signals generated by the exciter circuitry of the receiver/exciter unit 124 are directed to the Q multiplier circuit 55. After filtering by the Q multiplier circuit 55 these signals are supplied to a power amplifier 126 and passed on through the transmit/receive switch 122 to the antenna 102. The host controller 60 regulates the operation of the Q multiplier circuit to provide the level of filtering required for either transmit or receive modes of operation by setting the gain level of the Q multiplier circuit as previously described with respect to FIGS. 3 and 5. The flexibility of the Q multiplier circuit 55 allows for it to provide dual filtering functions for the same radio circuitry 120 under control of the controller 60.

Figure 7:
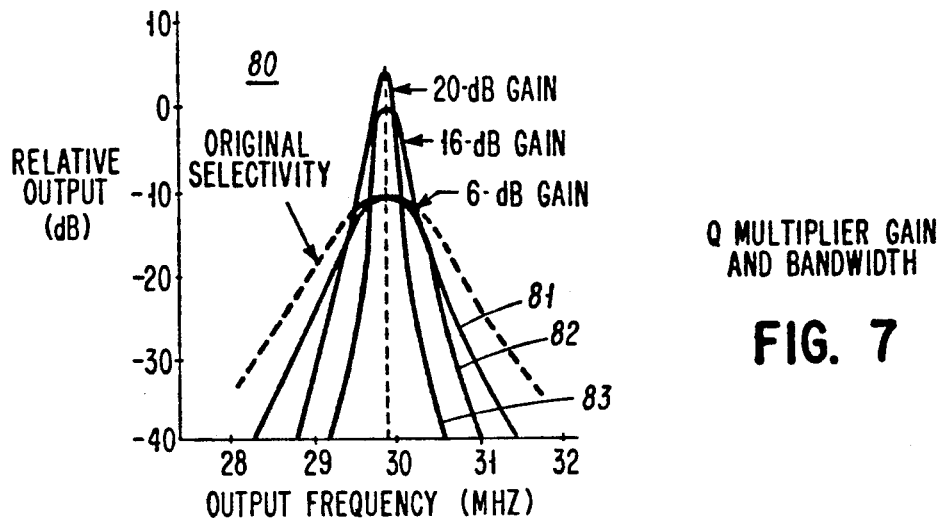
FIG. 7 provides a graph with frequency on the abscissa and output level on the ordinate showing typical gain and bandwith performance of a Q multiplier circuit.

Referring now to FIG. 7 the operation of a typical Q multiplier circuit such as the circuit 25 is illustrated in terms of a graph 80 of the gain versus the output frequency of such a circuit. The curves 81, 82, and 83 illustrate how the quality factor and selectivity of the circuit increase as the gain of the circuit is increased from the 6 dB to the 16 dB to the 20 dB levels. As the graph 80 illustrates a Q multiplier circuit can be used as a simple and effective filter by adjusting the gain level of the circuit to provide whatever selectivity may be required in specific applications. Furthermore, the gain of the circuit can be controlled in response to signal conditions to adjust the selectivity of the circuit and thereby allow the Q multiplier circuit to provide dynamically controlled filtering. In fact, the gain of a Q multiplier circuit can be controlled to provide predetermined levels of selectivity since changes in power gain are related to circuit Q-factor and selectivity in accordance with formula 1 below:

$$Delta\ Power\ Gain = 20\ LOG\ QX$$

where,

QX is the ratio between the circuit Q with feedback to the circuit Q without feedback.

Delta Power Gain is the ratio in dB of the output power with feedback to the output power without feedback.

Therefore a host controller 60 can in fact provide predetermined selectivity by regulating the operation of the Q multiplier circuit to provide exactly the gain required to result in the circuit selectivity desired for a specific application.

While particular embodiments of the present invention have been shown and described, it should be clear that changes and modifications may be made to such embodiments without departing from the true scope and spirit of the invention. It is intended that the appended claims cover all such changes and modifications.

I claim:

1. A radio transmitter/receiver assembly enabling a single filter module to perform both preselection and postselection functions, comprising:

a Q multiplier circuit which is constructed and arranged for filtering communications signals received by said assembly at a first selectivity level when the assembly is in a receive mode and for filtering communications signals transmitted by said assembly at a second selectivity level when the assembly is in a transmit mode;

a receiver/exciter for receiving and processing communications signals from said Q multiplier circuit when the assembly is in a receive mode and for generating and supplying communications signals to said Q multiplier circuit when the assembly is in a transmit mode;

a transmit/receive switch for directing communications signals from an antenna to said Q multiplier circuit when the assembly is in the receive mode and directing communications signals from said Q multiplier circuit to an antenna when the assembly is in the transmit mode;

a controller for generating and supplying control signals to said Q multiplier circuit, said receiver/exciter and said transmit/receive switch whereby said assembly can be configured in either the receive or the transmit mode of operations with said Q multiplier circuit functioning either as a preselector or a postselector at different levels of selectivity.

2. The radio transmitter/receiver assembly of claim 1, further including a power amplifier for amplifying the power of communications signals filtered by said Q multiplier circuit as a postselector prior to their supply to said transmit/receive switch when the assembly is in the transmit mode.

3. The radio transmitter/receiver assembly of claim 1, wherein said Q multiplier circuit includes:

an amplifier having an input signal characterized by an input power level and an output signal characterized by an output signal power level;

means for feeding back a feedback signal from the output of said amplifier to the input of said amplifier so as to combine with said input signal to said amplifier the means for feeding back including a band pass filter for regulating the frequency of operation of the Q multiplier circuit;

means for controlling the phase of the feedback signal fed back to the input of said amplifier in order to maintain positive feedback; and means for controlling the gain provided by said amplifier to operated at selectable gain levels representing different Q-factors for the Q multiplier circuit.

* * * * *